(12) United States Patent
Watase et al.

(10) Patent No.: US 6,966,050 B2
(45) Date of Patent: Nov. 15, 2005

(54) SOFTWARE BUILDING SUPPORT SYSTEM

(75) Inventors: Shinichiro Watase, Kawasaki (JP);
Katsuyuki Kanaji, Kawasaki (JP);
Keisuke Nomura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 540 days.

(21) Appl. No.: 10/059,254

(22) Filed: Jan. 31, 2002

(65) Prior Publication Data

US 2004/0015838 A1  Jan. 22, 2004

(30) Foreign Application Priority Data

Jan. 31, 2001  (JP) .............................. 2001-023712

(51) Int. Cl.$^7$ ............................................... G06F 9/44
(52) U.S. Cl. ..................................................... 717/109
(58) Field of Search .............................. 717/109, 107, 717/108; 715/500

(56) References Cited

U.S. PATENT DOCUMENTS

| | | | |
|---|---|---|---|
| 5,850,548 A | * 12/1998 | Williams | ..................... 717/107 |
| 6,100,195 A | * 8/2000 | Chan et al. | ................... 438/687 |
| 6,189,138 B1 | * 2/2001 | Fowlow et al. | .............. 717/107 |
| 6,684,383 B1 | * 1/2004 | Natori et al. | ................ 717/107 |
| 6,687,873 B1 | * 2/2004 | Ballantyne et al. | .......... 715/500 |
| 6,718,535 B1 | * 4/2004 | Underwood | ................ 717/101 |

* cited by examiner

*Primary Examiner*—Wei Y. Zhen
(74) *Attorney, Agent, or Firm*—Oblon, Spivak, McClelland, Maier & Neustadt, P.C.

(57) ABSTRACT

A software building support system capable of efficiently building, managing and reusing a software program. The software building support system includes a program design part for supporting the design of a composite program and for outputting the results thereof as a program structure information. The program design part includes a component line-connection part for defining the structure of the composite program on the basis of instructions obtained by a graphical interface, and a composite component setting part for setting a plurality of software components as a single composite component. The composite component setting part includes a terminal setting part for setting a terminal of the composite component, which is used for allowing the composite component to communicate with another external component, and an attribute setting part for setting an inherent property of the composite component.

4 Claims, 6 Drawing Sheets

```
<model type="CompositeProgramA">
    <interface>…DESCRIBE SPECIFICATIONS OF EXTERNAL TERMINAL PORTION AND ATTRIBUTE VALUE STORING PORTION
        <terminal id="t01" name="in" type="std+" />
            …INDICATE THAT INPUT TERMINAL HAVING NAME OF "in" AND TYPE OF "std+" EXISTS
        <property name="DBUrl" value="pc0006:DB010" />
        <property name="PrnUrl" value="pc0004:lpt01" />
    </interface>
    <implementation>…DESCRIBE STRUCTURE OF COMPOSITE COMPONENT
        <terminal name="in" id="t01" /> …CORRESPONDING TO DESCRIPTION OF EXTERNAL TERMINAL PORTION OF <interface>
        <component id="c01" name="TRANSACTION" type="TransactionType"
                    constraint="COST CODE CHECK:user.CodeCheckCC" />
        <component id="c02" name="USER PROCESSING" type="user.buhin1" />
        <component id="c03" name="DB STORAGE" type="StoreAccount" url="%DBUrl1%" />
        <component id="c04" name="CUTFORM OUTPUT" type="PrintAccount" url="%PrnUrl1%" />
        <connection from="t01" to="c01:in" />
        <connection from="c01:out" to="c02:in" />
        <connection from="c02:out" to="c03:in" />
        <connection from="c02:exl" to="c04:in" />
    </implementation>
</model>
```

FIG. 5

```
:
<component id="c08" type="CompositeProgramA" DBUrl="pc0010:DB001" PrnUrl="pc0020:lpt01" />
                                            ASSIGN DECLARED PORTION IN THE ITEM OF <property> AS ATTRIBUTE
<connection from="c07:out" to="c08:in" />
                                            ASSIGN DECLARED INPUT TERMINAL "in" IN THE ITEM OF <terminal> AS INTERFACE
:
```

FIG. 6

SOFTWARE BUILDING SUPPORT SYSTEM

BACKGROUND OF THE INVENTION

1. Field of the Invention

The present invention generally relates to a software building support system for supporting the building of a software program. More specifically, the invention relates to a software building support system, method and program for building a software program by connecting a plurality of software components, and a composite component comprising a combination of a plurality of software components.

2. Description of the Related Art

Conventionally, as a software building support system of this type, there is known a CASE (Computer Aided Software Engineering) tool for defining the structure of a software program via a graphical user interface.

In such a CASE tool, each of a plurality of processes (software components) in a software program to be built can be usually represented by a single icon so that the icons can be connected by lines to define the structure of the software program (the flow of processing between a plurality of software components).

As described above, in the conventional CASE tool, it is possible to define the structure of the software program by a graphical representation, which is the line-connection relationship between icons. Therefore, it is possible to carry out the operation for building the software program in a form, which is easily recognized by humans, and it is possible to relatively easily manage the software program thus build.

However, in the above-described conventional CASE tool, if the scale of the software program to be built increases to complicate the structure, the graphical representation is necessarily complicated, so that there is a problem in that it is accelerated to be difficult to grasp the structure of the whole software program. In addition, if it is difficult to grasp the structure of the software program, there is a problem in that it is also difficult to manage and reuse the software program thus built in accordance therewith.

SUMMARY OF THE INVENTION

It is therefore an object of the present invention to eliminate the aforementioned problems and to provide a software building support system, method and program capable of efficiently building, managing and reusing a software program to be built, regardless of the scale of the software program, and a composite component comprising a combination of a plurality of software components.

In order to accomplish the aforementioned and other objects, according to a first aspect of the present invention, there is provided a software building support system of building a software program by connecting a plurality of software components. The system includes: an interface part that receives an instruction from the outside; and a composite component setting part that sets a plurality of software components, which are associated with each other, as a single composite component, on the basis of the instruction obtained by the interface part.

In the software building support system according to the first aspect, the composite component setting part preferably includes a terminal setting part for setting a terminal of the composite component, which is used for allowing the composite component to communicate with another external component. Also, the composite component setting part preferably includes an attribute setting part for setting an inherent property of the composite component. In addition, the interface part is preferably adapted to display a plurality of software components as icons on a tool screen and to receive an operation for the icons as an instruction from the outside.

According to a second aspect of the present invention, there is provided a software building support method of building a software program by connecting a plurality of software components. The method includes the steps of: preparing a plurality of software components, which are associated with each other, on the basis of an instruction received from the outside; and setting the plurality of software components as a single composite component on the basis of the instruction received from the outside.

According to a third aspect of the present invention, there is provided a computer readable recording medium having stored a software building support program of building a software program by connecting a plurality of software components. The program causes a computer to execute the procedures of: preparing a plurality of software components, which are associated with each other, on the basis of an instruction received from the outside; and setting the plurality of software components as a single composite component on the basis of the instruction received from the outside.

According to a fourth aspect of the present invention, there is provided a computer readable recording medium having stored a composite component comprising a combination of a plurality of software components, which are associated with each other. The composite component includes: a terminal portion for setting a terminal for communicating with another external component; a processing describing portion for describing a flow of processing between a plurality of software components; and an attribute value storing portion for storing therein an attribute value indicative of an inherent property of the plurality of software components.

BRIEF DESCRIPTION OF THE DRAWINGS

The present invention will be understood more fully from the detailed description given hereafter and from the accompanying drawings of the preferred embodiments of the invention. However, the drawings are not intended to imply limitation of the invention to a specific embodiment, but are for explanation and understanding only.

In the drawings:

FIG. 5 shows a program structure information (XML file) corresponding to the structure of the composite component shown in FIG. 4;

FIG. 6 is a diagram showing a program structure information (XML file) used when the composite component shown in FIGS. 4 and 5 is integrated into another program.

DESCRIPTION OF THE PREFERRED EMBODIMENTS

Referring now to the accompanying drawings, a preferred embodiment of the present invention will be described below.

Software Building Support System

Figure 1:
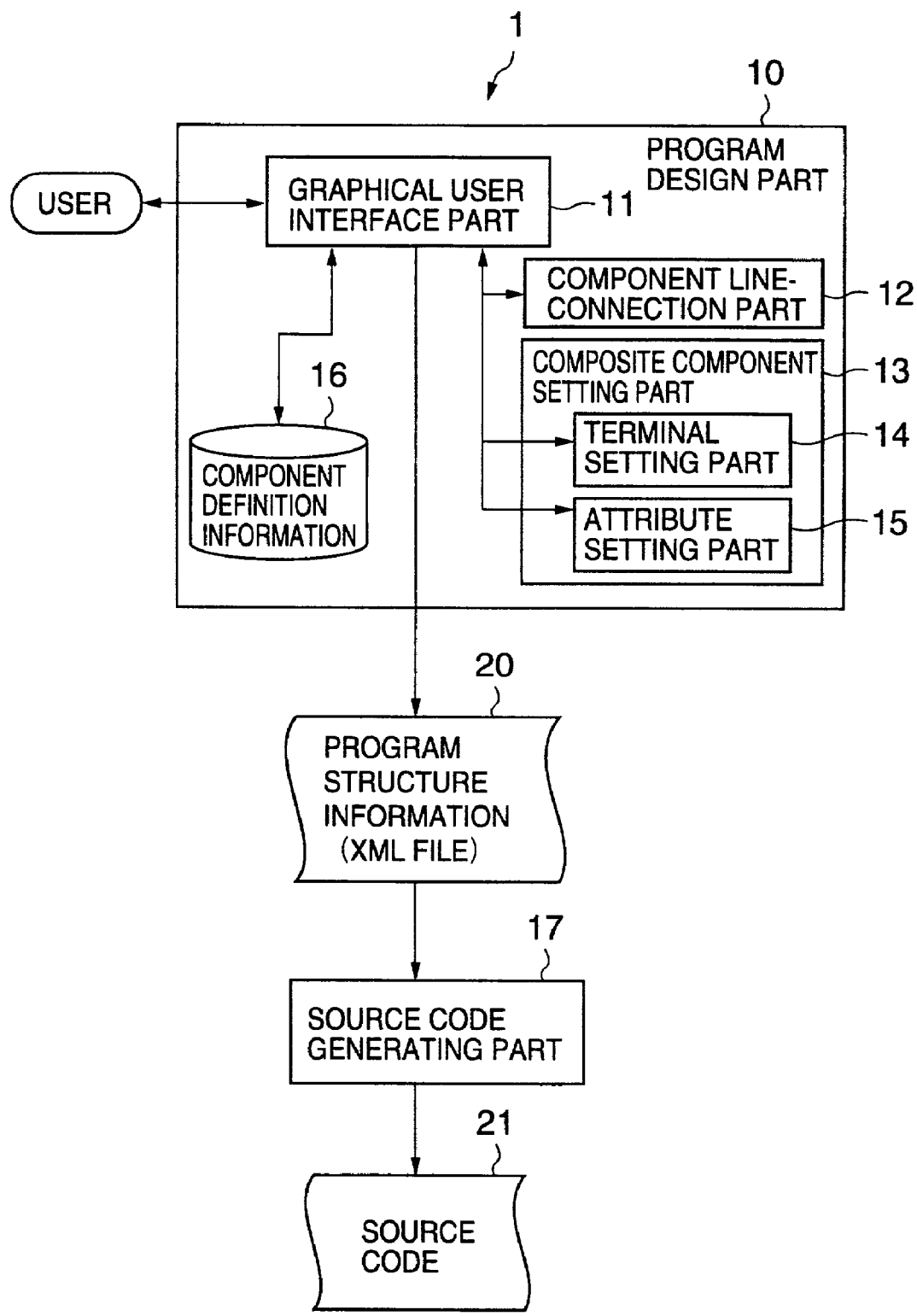
FIG. 1 is a functional block diagram showing a preferred embodiment of a software building support system according to the present invention.

FIG. 1 shows a preferred embodiment of a software building support system according to the present invention. As shown in FIG. 1, a software building support system 1 is adapted to build a composite program (software program) by connecting a plurality of software components. The software building support system 1 includes a program design part 10 for supporting the design of a composite program to output the results as a program structure information 20, and a source code generating part 17 for generating a source code 21 for the composite program on the basis of the program structure information 20 outputted from the program design part 10. It is noted that the program structure information 20 is described by the XML language.

The program design part 10 includes a graphical user interface part 11 for receiving instructions from the outside, a component line-connection part 12 for defining the structure of the composite program on the basis of the instructions received by the graphical user interface part 11, and a composite component setting part 13 for setting a plurality of software components, which are associated with each other, as a single composite component, on the basis of the instructions received by the graphical user interface part 11.

The graphical user interface 11 is adapted to display a plurality of software components as icons on a tool screen (see reference number 30 in FIG. 2) while referring to definition information on software components held in a component definition information 16, and to receive various operations (mouse operation and so forth) for the icons as instructions from the outside.

The component line-connection part 12 is adapted to define the structure of the composite program (the flow of processing between the plurality of software components) in accordance with a connected operation for the icons on the tool screen, and to output the results thereof, such as information on the integration of the software components and information on the relationship between the software components, via the graphical user interface part 11. It is noted that any one of the existing various line-connection tools (a tree structure editor, a directed graph structure editor, etc.) can be used for the component line-connection part 12.

The composite component setting part 13 is adapted to set the plurality of software component, which are related to each other by the component line-connection part 12, as a single composite component. The composite component setting part 13 includes a terminal setting part 14 for setting a terminal of the composite component for communicating between the composite component and another external component, and an attribute setting part 15 for setting an inherent property (attribute) of the composite component.

Figure 2:
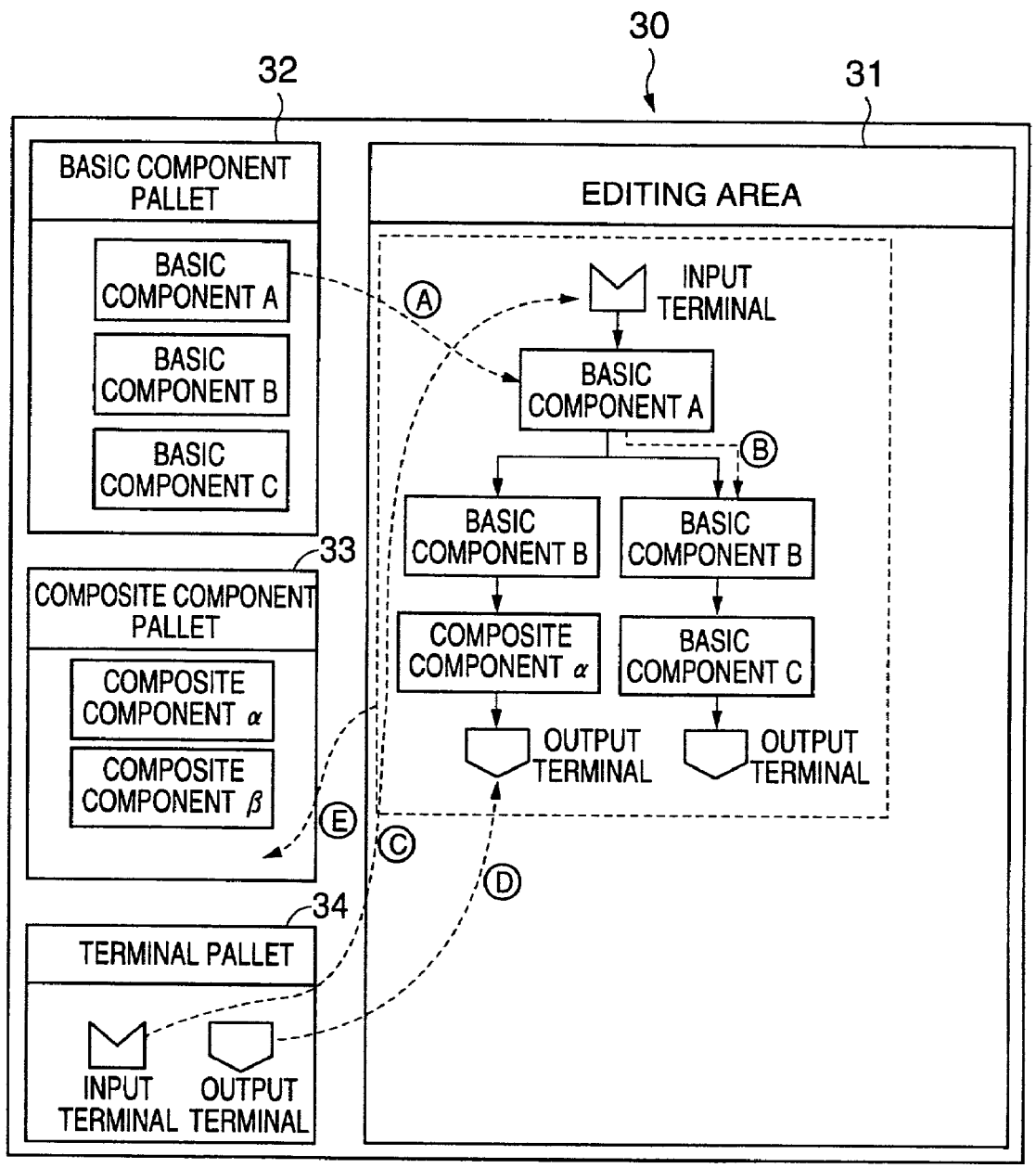
FIG. 2 is a diagram showing an example of a user interface (tool screen) for use in the software building support system shown in FIG. 1.

Referring to FIGS. 1 and 2, the operation of the software building support system 1 with the above-described arrangements will be described below.

In the software building support system 1 shown in FIG. 1, the graphical user interface part 11 of the program design part 10 displays a plurality of software components (a basic component for realizing a single process, and a composite component for realizing an integrated process associated with each other) as icons on the tool screen, and receives various operations for these icons as instructions from the outside.

FIG. 2 shows an example of such a tool screen. On the tool screen 30 shown in FIG. 2, a user can use an input unit, such as a mouse, for carrying out various operations with respect to icons.

Specifically, the user selects a desired icon from icons arranged in a basic component pallet 32 or a composite component pallet 33, and carries out a predetermined operation with respect to the selected icon (a drag and drop operation or the like) to arrange the icon in an editing area 31 (see (A) in FIG. 2). In addition, icons are connected to each other by lines in the editing area 31 to connect a plurality of basic components and a composite component (see (B) in FIG. 2).

If an operation for connecting the plurality of software components (the plurality of basic components and composite component) associated with each other is carried out, these software components are set as a single composite component. Therefore, a terminal for communicating between the composite component and another external component is set with respect to the composite component, and an inherent property of the composite component is set with respect to the composite component.

Specifically, an icon for an input terminal is selected from icons arranged in a terminal pallet 34, and a predetermined operation (a drag and drop operation or the like) is carried out with respect to the selected icon to arrange the icon in the editing area 31 (see (C) in FIG. 2). In addition, an icon for an output terminal is selected from the icons arranged in the terminal pallet 34, and a predetermined operation (a drag and drop operation or the like) is carried out with respect to the selected icon to arrange the icon in the editing area 31 (see (D) in FIG. 2).

In addition, a predetermined operation (a pop-up of dialog or the like) is carried out in the editing area 31, and attribute values indicative of inherent properties of the plurality of basic components and composite component arranged in the editing pallet 31 are inputted with respect to the popped-up dialog (not shown).

Thus, the plurality of basic components and composite component associated with each other can be set as a single composite component. Furthermore, the composite component thus set can be registered as a new composite component in the composite component pallet 33 (see (E) in FIG. 2). Thus, the newly registered composite component can be reused as a software component when a software program or another composite component is built.

Composite Component

The details of the composite component thus set will be described below.

Figure 3:
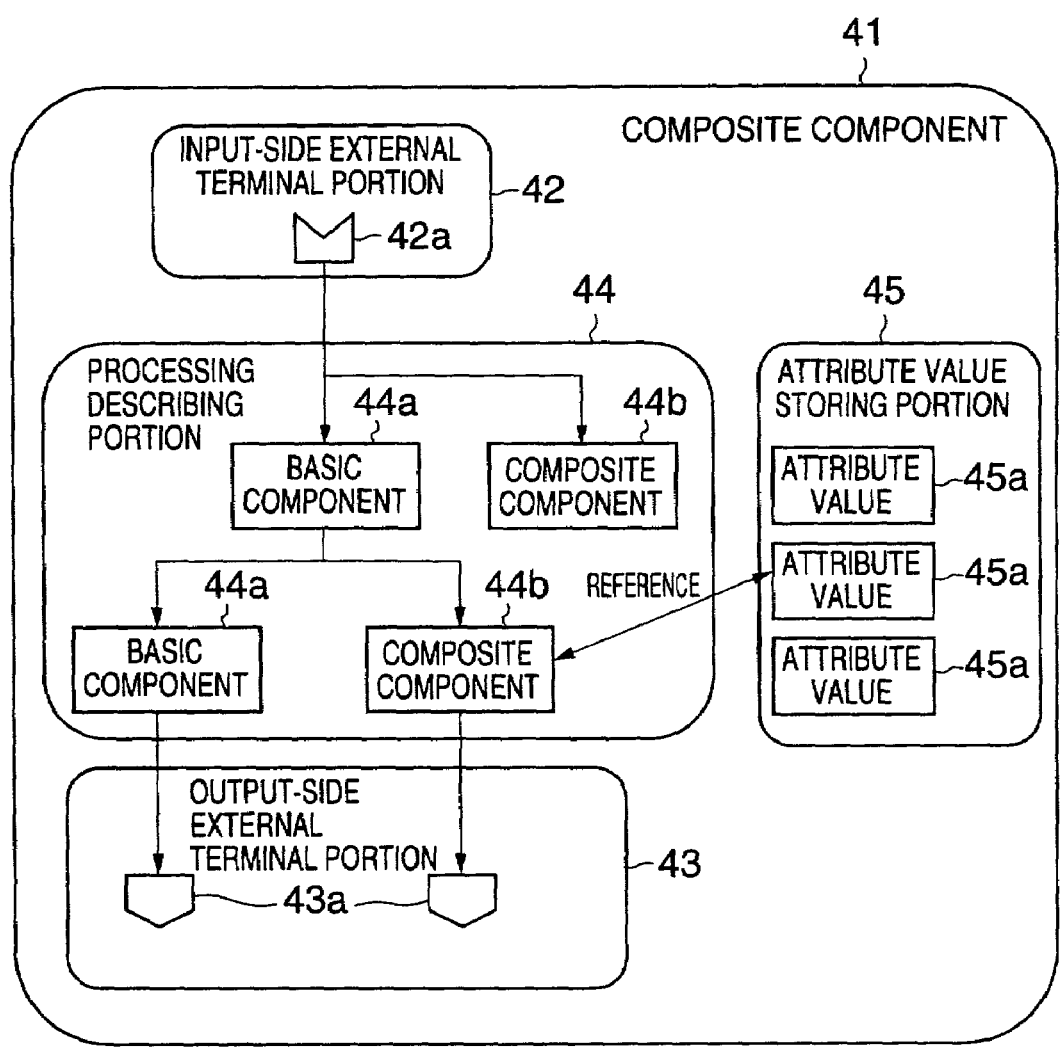
FIG. 3 is a diagram showing the structure of a composite component built by the software building support system shown in FIG. 1.

FIG. 3 schematically shows the structure of a composite component. As shown in FIG. 3, a composite component 41 comprises a combination of a plurality of software components associated with each other. The connected software components may be basic components 44a which are previously prepared by the software building support system, as well as composite components 44b which are set by connecting the plurality of basic components 44a as described above.

As shown in FIG. 3, the composite component 41 includes an input-side external terminal portion 42 in which an input terminal 42a for communicating with another external component is set, an output-side external terminal portion 43 in which output terminals 43a for communicating with other external components are set, a processing describing portion 44 in which the flow of processing between the plurality of software components 44a and 44b is described, and an attribute value storing portion 45 for storing attribute values 45a indicative of inherent properties of the plurality of software components 44a and 44b.

The input-side external terminal portion 42 is a port for receiving a series of data inputted from other external components, and is provided with a desired number of input terminals 42a. The output-side external terminal portion 43 is a port for outputting a series of data to other external components, and is provided with a desired number of output terminals 43a. The processing describing portion 44 is designed to describe the flow of processing in the composite component 41, and is represented by a combination of the plurality of software components 44a and 44b. The attribute value storing portion 45 is a variable for storing the attribute values 45a indicative of the inherent properties of the composite component 41. In the attribute value storing portion 45, setting values and so forth required to operate the composite component 41 and so forth are stored.

If a series of data are inputted to the input terminal 42a in the input-side external terminal portion 42 in such a composite component 41, the series of data are delivered to the plurality of software components 44a and 44b wherein the flow of processing has been described in the processing describing portion 44.

Each of the software components 44a and 44b in the processing describing portion 44 carries out an operation, which is determined with respect to a corresponding one of the software components 44a and 44b, on the basis of data, which is inputted via the input terminal 42a, while referring to its own attribute value and the attribute values 45a stored in the attribute value storing portion 45. Furthermore, if the composite component 44b is arranged as the composite component 41 shown in FIG. 3 and if the flow of processing reaches the composite component 44b, data is inputted to the input-side external terminal portion of the composite component 44b, and the same processing is carried out in the composite component 44b as a nest.

Thereafter, the results of processing carried out by the processing describing portion 44 are outputted to a corresponding one of the output terminals 43a in the output-side external terminal portion 43.

Furthermore, the composite component 41 thus prepared can link the software components to each other by connecting the input terminal 42a of the input-side external terminal portion 42 and the output terminal 43a of the output-side external terminal portion 43 to the terminals of other external components. In this case, the input terminal 42a and the output terminal 43a are contacts (interfaces) which are connected to the terminals of other external components, and each of the attribute values 45a in the attribute value storing portion 45 is the attribute of the whole composite component. In addition, the composite component 41 thus prepared can be reused as a composite component 44b in its own processing describing portion 44, as an infinite nest.

EXAMPLE

Figure 4:
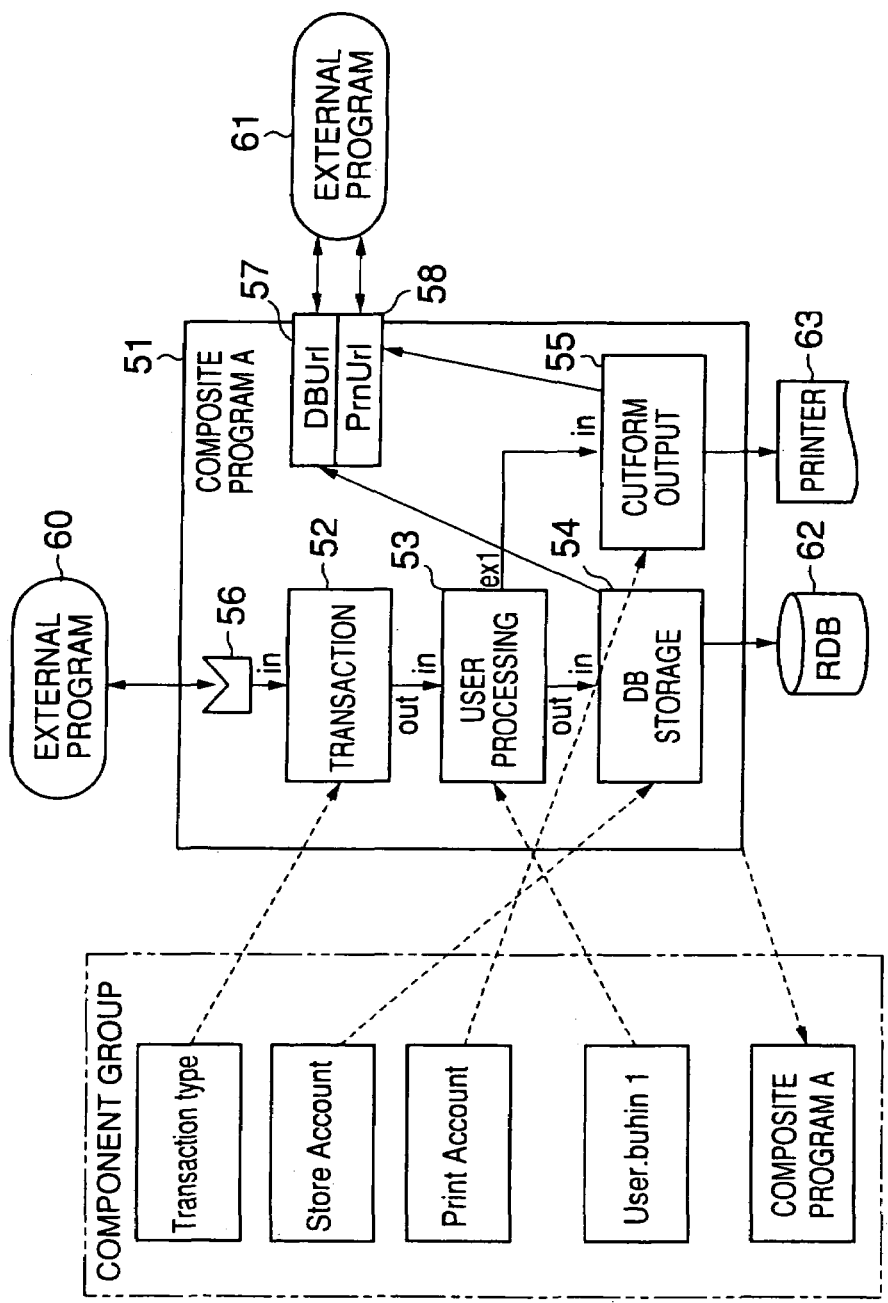
FIG. 4 shows a concrete example of the composite component shown in FIG. 3.

FIGS. 4 through 6 are drawings for explaining an example of a composite component 41.

As shown in FIG. 4, a composite component 51 (a composite program A) includes an input terminal (an input-side external terminal portion) 56 for communicating with another external program (an external component) 60, a plurality of software components (a transaction component 52, a user processing component 53, a DB storage component 54 and a cutform output component 55) in which the flow of processing is described, and variables (attribute value storing portions) 57 and 58 for storing therein attribute values indicative of inherent properties of the software components (the DB storage component 54 and cutform output component 55 in FIG. 4). For example, the attribute values include header information, page length (the number of lines on a page) and margin size of a cutform which is required when the cutform output component 55 of the composite component 51 operates. Furthermore, the attribute values stored in the variables 57 and 58 can be set and changed by an external program 61. In addition, the composite component 51 shown in FIG. 4 is provided with no output terminal since the DB storage component 54 and the cutform output component 55 has the function of directly outputting data to a relational database (RDB) 62 and a printer 63, respectively.

Furthermore, the composite component 51 with such a structure is outputted as a program structure information 71 shown in FIG. 5, by the program design part 10 shown in FIG. 1. As shown in FIG. 5, the program structure information 71 can define the structure of a composite component in an independent form of an actual platform since it is described by the XML language. Specifically, in the item of <interface> . . . <interface/> in FIG. 5, the specifications of an external terminal portion (item of <terminal . . . />) and an attribute value storing portion (item of <property . . . />) are described. In the item of <implementation>. . . <implementation/>, the structure of the composite component is described by information (<component . . . />on the integration of software components, information (<connection . . . />) on the relationship between the software components, and so forth.

In addition, the composite component 51 thus set is integrated into another program as a software component. FIG. 6 shows a program structure information when the composite component 51 shown in FIG. 4 is integrated into another program. If the composite component 51 is integrated into another program as shown in FIG. 6, a property declared in an attribute value storing portion (item of <property . . . />) is assigned as the attribute of the composite component, and an input terminal declared in an external terminal portion (item of <terminal . . . />) is assigned as the interface of the composite component. Furthermore, as shown in FIG. 6, the program structure information 72 is also described by the XML language.

Thus, according to this preferred embodiment, since a plurality of software components associated with each other are set as a single composite component on the basis of instructions received from the outside, it is possible to cause a software program to be a component at a desired level, so that it is possible to efficiently build, manage and reuse a larger software program. Specifically, even if the scale of a software program to be built increases to complicate the structure thereof, it is possible to hold a graphical representation as it remains being simple, and it is possible to easily grasp the structure of the whole software program. In addition, since the software program thus built itself can be used as a software component (a composite component), it is possible to improve reusability. In particular, it is possible to connect a plurality of software components as an infinite nest, so that it is possible to further improve reusability. Moreover, this preferred embodiment can be easily applied to the existing CASE tool (e.g., a line-connection assembling type) or the like, so that it is possible to build a software program by a generalized and unified technique.

In addition, according to this preferred embodiment, the terminal for communicating between the composite component and another external component is set with respect to the composite component, and the inherent property of the composite component is set with respect to the composite component, so that it is possible to systematically form a component in a form according to an object-oriented concept.

Furthermore, in the above-described preferred embodiment, a plurality of software components (basic components and composite components) associated with each other, are connected by the line-connection setting part 12 of the program design part 10, so that the composite component setting part 13 sets the composite component with respect to the software components thus connected. However, the present invention should not be limited thereto, and a plurality of software components (basic components and composite components) may be extracted from the existing software program by the assignment of a scope or the like to set a composite component with respect to the extracted software components.

While the program structure information 20 (the program structure information 71, 72) is described by the XML language in the above-described preferred embodiment, the present invention should not be limited thereto, but the program structure information 20 may be described by a desired language.

Figure 7:
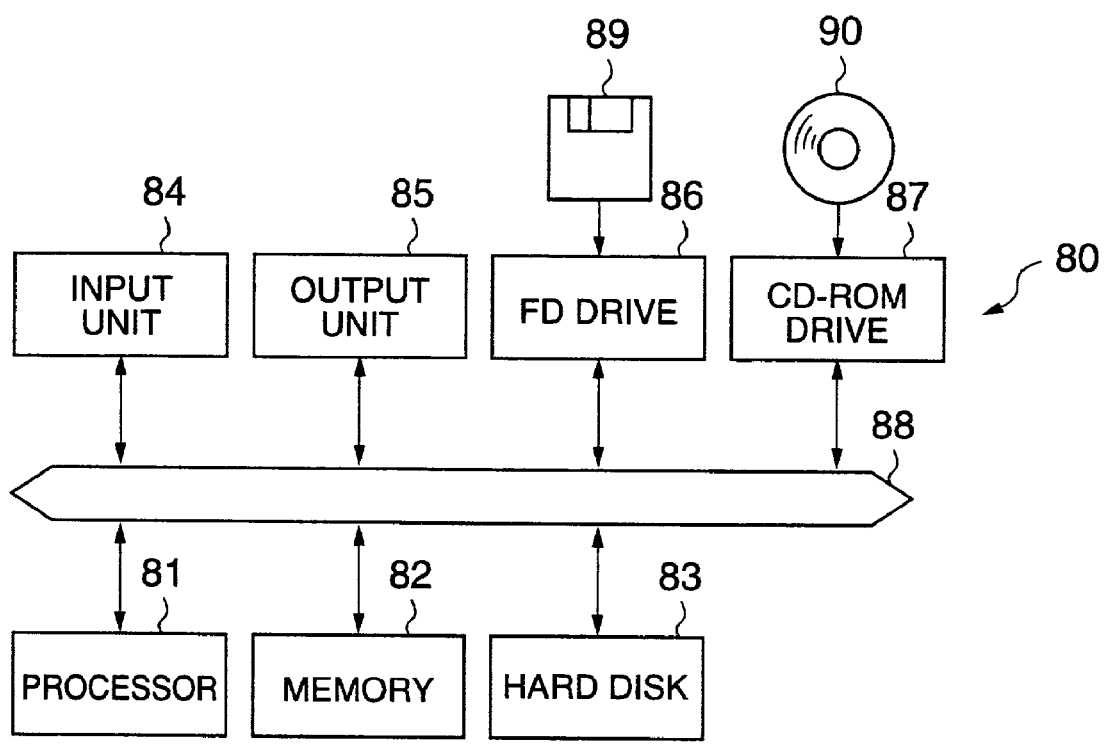
FIG. 7 is a hardware block diagram showing an example of a computer system to which a software building support system according to the present invention is applied.

In the above-described preferred embodiment, both of the program design part 10 and the source code generating part 17 can be realized as a program module operating on a computer system 80 shown in FIG. 7. The software components (including the composite component) can also be realized as a program module operating on the computer system 80 shown in FIG. 7. The computer system 80 includes: a bus 88; a processor 81, a memory 82 and a hard disk 83 which are connected to the bus 88; and peripheral apparatuses (an input unit 84, such as a keyboard and a mouse, an output unit 85, such as a display or a printer, an FD drive 86 and a CD-ROM drive 87). The above-described program modules can be stored in a computer-readable recording medium, such as the memory 82, the hard disk 83, a flexible disk 89 or a CD-ROM 90, and can be read out of the processor 81 to be executed to realize the above-described functions or procedures.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A software building support system of building a software program by connecting a plurality of software components, said system comprising:
an interface configured to receive an instruction from a user, said interface adapted to display a plurality of software components as icons on a tool screen and receive an operation for the icons as an instruction from the user; and
a composite component setting part configured to set a specific group of software components, which are associated with each other, as a single composite component, on the basis of the instruction obtained by said interface, said composite component setting part including:
a terminal setting part configured to set a terminal of the composite component, said terminal configured to allow the composite component to communicate with another external component; and
an attribute setting part for setting an inherent property of the composite component,
wherein the tool screen displayed by the interface part including a pallet area used for presenting a plurality of icons corresponding to respective software components to be combined, and an editing area used for combining a plurality of the icons corresponding to the respective software components, and the composite component set by the composite component setting part is registered as an icon corresponding to a new software component in the pallet area of the tool screen.

2. A software building support method of building a software program by connecting a plurality of software components, said method being realized by steps operated on a computer system, said method comprising:
displaying a tool screen including a pallet area used for presenting a plurality of icons corresponding to respective software components to be combined, and an editing area used for combining a plurality of the icons corresponding to the respective software components;
identifying a specific group of software components, which are associated with each other, on the basis of an operation for the icons displayed in the pallet area and the editing area of the tool screen received as an instruction from a user;
setting said specific group of software components as a single composite component on the basis of an operation for the icons displayed in the editing area of the tool screen, received as an instruction from the user;
setting a terminal of the composite component, which is used for allowing the composite component to communicate with another external component, on the basis of an operation for the icons displayed in the editing area of the tool screen, received as an instruction from the user;
setting an inherent property of the composite component on the basis of an operation for the icons displayed in the editing area of the tool screen received as an instruction from the user; and
registering the composite component, whose terminal and inherent property has been set, as an icon corresponding to a new software component in the pallet area of the tool screen.

3. A computer readable recording medium having stored thereon a composite component comprising a combination of a plurality of software components configured to be executed by a computer, said composite component being built by the method set forth in claim 2.

4. A computer readable recording medium having stored a software building support program of building a software program by connecting a plurality of software components, said program causing a computer to execute the procedures of:
displaying a tool screen including a pallet area used for presenting a plurality of icons corresponding to respective software components to be combined, and an editing area used for combining a plurality of the icons corresponding to the respective software components;
identifying a specific group of software components, which are associated with each other, on the basis of an operation for the icons displayed in the pallet area and the editing area of the tool screen received as an instruction from a user;

setting said specific group of software components as a single composite component on the basis of an operation for the icons displayed in the editing area of the tool screen received as an instruction from the user;

setting a terminal of the composite component, which is used for allowing the composite component to communicate with another external component, on the basis of an operation for the icons displayed in the editing area of the tool screen, received as an instruction from the user;

setting an inherent property of the composite component, on the basis of an operation for the icons displayed in the editing area of the tool screen, received as an instruction from the user;

registering the composite component, whose terminal and inherent property has been set, as an icon corresponding to a new software component in the pallet area of the tool screen.

* * * * *